United States Patent
Laurösch et al.

(10) Patent No.: US 6,917,289 B2
(45) Date of Patent: Jul. 12, 2005

(54) SWITCH CUPBOARD OR SWITCH CUPBOARD ARRANGEMENT COMPRISING A MONITORING DEVICE ARRANGED THEREIN

(75) Inventors: Sven Laurösch, Haiger (DE); Jörg Kreiling, Biebertal (DE)

(73) Assignee: Rittal GmbH & Co. KG, Herborn (DE)

( * ) Notice: Subject to any disclaimer, the term of this patent is extended or adjusted under 35 U.S.C. 154(b) by 0 days.

(21) Appl. No.: 10/250,653

(22) PCT Filed: Jan. 26, 2002

(86) PCT No.: PCT/EP02/00829

§ 371 (c)(1),
(2), (4) Date: Jul. 7, 2003

(87) PCT Pub. No.: WO02/069064

PCT Pub. Date: Sep. 6, 2002

(65) Prior Publication Data

US 2004/0052040 A1 Mar. 18, 2004

(30) Foreign Application Priority Data

Feb. 22, 2001 (DE) .......................................... 101 08 599

(51) Int. Cl.⁷ .............................. B60Q 1/00; G08B 3/00; H02B 7/00; H05K 5/00
(52) U.S. Cl. ....................... 340/525; 340/501; 340/531; 340/691.6; 340/539.1; 361/600; 361/605; 361/683; 361/724
(58) Field of Search ................................ 340/500, 501, 340/525, 531, 506, 679, 691.1, 691.6, 539.1, 539.17; 361/600, 605, 683, 724; 709/224; 714/23, 47, 4

(56) References Cited

U.S. PATENT DOCUMENTS

| | | | | |
|---|---|---|---|---|
| 6,163,854 A | * | 12/2000 | Hain et al. | 714/4 |
| 6,222,448 B1 | * | 4/2001 | Beck et al. | 340/506 |
| 6,346,882 B1 | * | 2/2002 | Hain et al. | 340/521 |
| 6,348,745 B1 | * | 2/2002 | Laurosch et al. | 307/112 |
| 6,549,127 B1 | * | 4/2003 | Strackbein et al. | 340/506 |
| 6,693,528 B1 | * | 2/2004 | Hain et al. | 340/506 |
| 6,744,363 B1 | * | 6/2004 | Nicolai et al. | 340/506 |
| 2001/0047405 A1 | * | 11/2001 | Kreiling et al. | 709/223 |

FOREIGN PATENT DOCUMENTS

| | | |
|---|---|---|
| DE | 197 10 016 C1 | 4/1998 |
| DE | 197 48 536 | 5/1999 |
| EP | 0 932 090 A2 | 7/1999 |
| WO | 97/34345 | 9/1997 |
| WO | 00/23857 | 4/2000 |
| WO | 00/77584 A1 | 12/2000 |

* cited by examiner

Primary Examiner—Donnie L. Crosland
(74) Attorney, Agent, or Firm—Pauley Petersen & Erickson

(57) ABSTRACT

A switch cupboard or a switch cupboard arrangement having at least one monitoring device for switch cupboard functions including temperature regulation arranged therein. The invention is constructed in a simple manner and provided with multiple monitoring possibilities, whereby the monitoring device is connected to another server-switching device, which is arranged in the switch cupboard or the switch cupboard arrangement in a data transmission link. The monitoring device is configured in such a way that it can detect operational data from the server-switching device and/or provide display information on a display control device associated with the server-switching device, and/or record configuration data inputted via the display control device.

16 Claims, 1 Drawing Sheet

SWITCH CUPBOARD OR SWITCH CUPBOARD ARRANGEMENT COMPRISING A MONITORING DEVICE ARRANGED THEREIN

BACKGROUND OF THE INVENTION

1. Field of the Invention

This invention relates to a switchgear cabinet, or to a switchgear cabinet arrangement with at least one monitoring device for switchgear functions, including temperature regulation, installed in the switchgear cabinet.

2. Discussion of Related Art

Such a switchgear cabinet with a monitoring device, which also takes on control functions, is shown in PCT International Publication WO 97/34345 as being known. In this known switchgear cabinet, various sensors important for the operation of the switchgear cabinet per se, such as for example temperature sensors, vibration sensors, smoke detectors, moisture sensors, voltage sensors, door limit stop switches and the like, as well as actuators and data transmission connections to external operating devices, are connected via input and output interfaces to a central control device with a processor or micro-controller provided therein.

Various components, such as for example a cooling device, a ventilator or a heater with appropriate control or regulating components, can be provided for temperature regulation. Such a monitoring device becomes more complex with the number of different monitoring, control and operating options.

SUMMARY OF THE INVENTION

One object of this invention is to provide a switchgear cabinet, or a switchgear cabinet arrangement, of the type mentioned above but wherein the monitoring options are increased and wherein the outlay is kept as low as possible.

This object is attained by the characteristics discussed in this specification and in the claims. The monitoring device can be put into data transmission connection with a server switch-over device additionally arranged in the switchgear cabinet or the switchgear cabinet arrangement. The monitoring device is designed for registering operational data of the server switch-over device and/or for issuing display data to a display control device assigned to the server switch-over device, and/or for picking up configuration data entered via the display control device.

From this design and connection with the server switch-over device results an advantageous monitoring possibility for the server, wherein the properties of the monitoring device, such as error detection, error registration and alarm reports can be advantageously utilized. Additionally or alternatively, in the reverse manner the special properties of the display control device or on-screen display (OSD) assigned to the server switch-over device are also utilized for the monitoring device in that reports, configuration states and the like can be displayed by the display control device and/or a configuration of the monitoring device can be performed.

In this case monitoring is designed so that the operational data include function data and/or operating data. It is thus possible, for example, to determine whether server computers are or were activated or deactivated, or whether authorized or unauthorized users performed an operation or intend to perform one, wherein user names, passwords, computer identification, console numbers and other identifications can be registered and evaluated.

Advantageously, the data transmission between the monitoring device and the server switch-over device is performed through a serial connection.

In other embodiments, the server switch-over device and the monitoring device have separate housings, and the connection is wireless or via a cable over serial interfaces, or the server switch-over device and the monitoring device are arranged in the same housing in separate modules, wherein a common main switch and a common power supply are provided. Suitable arrangement options also include a cable connection, while it is possible with the placement in a common housing to clearly predetermine the combination from the start, wherein options still exist by using replacement or complementing of modules.

Also, the steps are advantageous for the design and operation wherein the monitoring device is or can be connected to a local or long-distance transmission network, and is or can be connected via the transmission network with a remote monitoring station. Suitable data transmission protocols, for example at this time via simple network management protocol (SNMP) can be used for this purpose. Alarm and status reports regarding the states of the sensors and actuators in the switchgear cabinet and any server switch-over device, which are forwarded by the monitoring device via the network are in this case transmitted as a unit (trap). In this connection, contained in the report are, for example, date, time, information regarding the server switch-over device, for example user name, identification of the server computer, console number and further information, as well as reports from the server switch-over device, for example whether the computer is active or inactive, change in the configuration of the server switch-over device, change of the access authorization to the server switch-over device and starting of the server, or the like. In the process it is possible to differentiate between fixed reports and changing reports.

Further measures contribute to the advantageous design, wherein several server switch-over devices are provided in the switchgear cabinet arrangement, wherein only a single monitoring device is assigned to at least one or several server switch-over devices. In this case, the server switch-over devices are cascade-connected to the servers assigned to them, wherein all server switch-over devices and the servers connected to them are managed for display and operation by only one display control device. Here, cascading is provided so that in place of one or several servers, one or several server switch-over devices are connected to the appropriate connector of a server switch-over device. It is then possible to connect still further server switch-over devices to the other server switch-over device in place of the one or several servers connected there. In this case, all connected server switch-over devices and servers can be managed by the display control device of the overriding server switch-over device and displayed in a well arranged way. Here, the display control device is also used for the monitoring devices connected to the respective server switch-over device and/or the further server switch-over devices. In this case, it is advantageous to connect a monitoring device to the server switch-over device containing the managing display control device. Because all essential data from the cascaded arrangement come together in this server switch-over device, the monitoring device can also be employed for monitoring the respective data.

Operation can be made easier with a display unit that is connected via a remote console with the server switch-over device or devices.

BRIEF DESCRIPTION OF THE DRAWINGS

This invention is explained in greater detail in view of an exemplary embodiment, referring to the drawing, wherein the single FIGURE is a schematic view of a system according to this invention.

DESCRIPTION OF PREFERRED EMBODIMENTS

Figure 1:
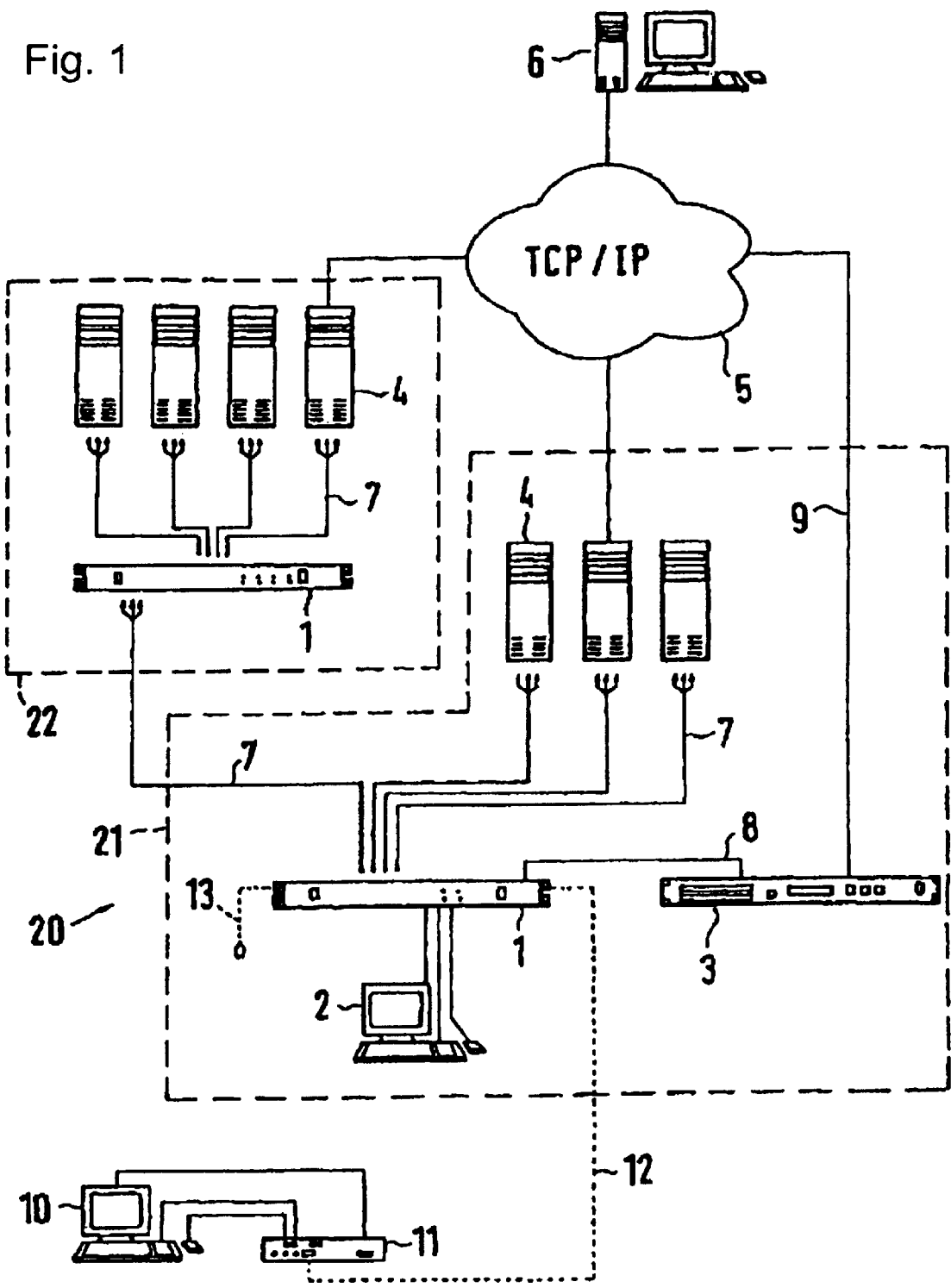

FIG. 1 schematically represents a cascaded arrangement of two server switch-over devices 1 with servers 4 connected with it via server connecting cables 7 and with a monitoring device 3 connected to a server switch-over device 1. As one example, the arrangement is placed into two switchgear cabinets 21, 22 of a switchgear cabinet arrangement.

The monitoring device 3 is connected via a network connector 9 with a remote transmission network, such as the intra-net, or also internet, wherein customary protocols, for example simple network management protocol (SNMP) can be used. In this case an operator can display the monitoring results, if required interrogate it further, and record it via a monitoring station 6 connected to the remote transmission network 5.

The connection between the monitoring device 3 and the server switch-over device 1 is serial and provided by a connecting cable 8, if required with matching of levels. However, a wireless connection is also possible. A display control device 2 or on-screen display (OSD) for interrogating and operating the server switch-over devices 1 and the servers 4 connected with the latter is assigned in a known manner to the server switch-over device 1. In the present case a managing function is assigned to this display control device 2 in the cascaded arrangement wherein all servers 4 arranged in the cascade and, if desired, also further server switch-over devices 1 can be displaced in appropriate representations and can be operated by associated operating devices, such as a keyboard or mouse. A display unit 10, as well as a keyboard and a mouse are connected to the overriding server switch-over device 1 via a connecting line 12 of a length of up to 200 meters, for example, as well as a remote console 11 in order to provide an operation also from a remote location if the conditions in the vicinity of or near the cabinet arrangement are disadvantageous, for example. The overriding server switch-over device 1 also has a power connector for energy supply.

The monitoring device 3 is designed so that, if preselected adjustable threshold values are not maintained, it is possible with appropriate interfaces and sensors, to monitor, detect, register in a memory, report and trigger alarms in connection with all states, for example moisture, locked state of the door, temperature, vibration, appearance of smoke, current and voltage states, which are essential for the functioning of the switchgear cabinet under various employment conditions. Various cooling or heating units, such as heat exchangers, ventilators, cooling devices, heaters with appropriate regulation and control units, can be provided for temperature control and/or temperature regulation. Preferably the monitoring device 3 is also designed for emergency operation, wherein it is supplied by an emergency power supply and, on the other hand, wherein it monitors and maintains essential functions during emergency operations. This design of the monitoring unit 3 substantially corresponds to the one described in PCT International Publication WO 97/34345. Moreover, further measures relate to the access control system with identification controls, known per se, such as chip cards, transponders or similar identification devices, for example, as well as corresponding registration devices.

Operational data present in the server switch-over device 1, such as functional data and/or operating data, are registered via the serial connection between the monitoring device 3 and the server switch-over device 1, and status reports or alarm reports are generated if preselected criteria are not maintained. The alarm and status reports are transmitted by the monitoring device 3 in the form of a consolidated report (trap). Fixed reports, for example the date, time, system information regarding the monitoring device 3 and system information regarding the server switch-over device 1, are contained in this report. The start of one or several computers, such as a soft boot, information as to whether a computer is active or has been deactivated, a change in the configuration of the server switch-over device 1 and/or a change in the access rights to the server switch-over device 1, are contained as variable reports in the trap. Moreover, the user name, the computer identification, a console number and further information are monitored. Any unauthorized use can also thus be detected. With the monitoring device 3 it is possible to also control and register the status of the server switch-over device or devices 1, as well as the servers 4, at the monitoring station 6.

In the reverse way, the operating functions of the monitoring device are taken up by the display control device 2, which is assigned to the server switch-over device 1, namely the display of monitoring data, reports and descriptive data, for example the layout of the monitoring device, connected sensors and actuators and their identification, which are transmitted by the monitoring device 3 to the server switch-over device 1 via the serial connection 8. The display control device 2 is designed so that the data relating to the monitoring device 3 are displayed on it in a user-friendly way in addition to the data relating to the servers 4 and possibly further server switch-over devices 1. The monitoring device 4 can be configured by the operating elements assigned to the display control device 2, such as a keyboard and a mouse, and threshold values for monitoring the switchgear cabinet interior can be entered and altered.

If, in a cascaded arrangement, a respective monitoring device 3 is also assigned to all, or portion of the further server switch-over devices 1, the data from all monitoring devices 3 can be displayed on a single managing display control device 2, and the configuration of all monitoring devices 3 can also be performed via the display control device 2.

What is claimed is:

1. In a switchgear cabinet having a monitoring device (3) for switchgear functions, including temperature regulation, installed therein, the improvement comprising:

the monitoring device (3) put into a data transmission connection with a server switch-over device (1) arranged in the switchgear cabinet, and the monitoring device (3) designed at least one of for registering operational data of the server switch-over device (1), for issuing display data to a display control device (2) assigned to the server switch-over device (1), and for picking up configuration data entered via the display control device (2).

2. In the switchgear cabinet in accordance with claim 1, wherein the operational data include at least one of function data and operating data.

3. In the switchgear cabinet in accordance with claim 2, wherein the data transmission between the monitoring device (3) and the server switch-over device (1) is performed through a serial connection.

4. In the switchgear cabinet in accordance with claim 3, wherein one of:

the server switch-over device (1) and the monitoring device (3) have separate housings, and the data transmission connection is one of wireless and via a cable over serial interfaces; and the server switch-over device (1) and the monitoring device (3) are arranged in a same housing in separate modules, and have a common main switch and a common power supply.

5. In the switchgear cabinet in accordance with claim 4, wherein the monitoring device (3) is connectible to one of a local and a long-distance transmission network (5), and is connectible via a remote monitoring station (6).

6. In the switchgear cabinet in accordance with claim 5, wherein additional server switch-over devices (1) are provided in the switchgear cabinet and the monitoring device (3) is assigned to at least one additional server switch-over devices (1).

7. In the switchgear cabinet in accordance with claim 6, wherein the server switch-over device (1) and the additional server switch-over devices (1) are cascade-connected with assigned servers (4) and are managed for display and operation by the display control device (2).

8. In the switchgear cabinet in accordance with claim 7, wherein the monitoring device(3) is connected to the server switch-over device (1) to which the managing display control device (2) is assigned.

9. In the switchgear cabinet in accordance with claim 8, wherein a display unit (10) is connected via a remote console (11) with the server switch-over device (1).

10. In the switchgear cabinet in accordance with claim 1, wherein the data transmission between the monitoring device (3) and the server switch-over device (1) is performed trough a serial connection.

11. In the switchgear cabinet in accordance with claim 1, wherein one of:

the server switch-over device (1) and the monitoring device (3) have separate housings, and the data transmission connection is one of wireless and via a cable over serial interfaces; and the server switch-over device (1) and the monitoring device (3) are arranged in a same housing in separate modules, and have a common main switch and a common power supply.

12. In the switchgear cabinet in accordance with claim 11, wherein the monitoring device (3) is connectable to one of a local and a long-distance transmission network (5), and is connectible via a remote monitoring station (6).

13. In the switchgear cabinet in accordance with claim 1, wherein additional server switch-over devices (1) are provided in the switchgear cabinet and the monitoring device (3) is assigned to at least one additional server switch-over devices (1).

14. In the switchgear cabinet in accordance with claim 13, wherein the server switch-over device (1) and the additional server switch-over devices (1) are cascade-connected with assigned servers (4) and are managed for display and operation by the display control device (2).

15. In the switchgear cabinet in accordance with claim 14, wherein the monitoring device (3) is connected to the server switch-over device (1) to which the managing display control device (2) is assigned.

16. In the switchgear cabinet in accordance with claim 1, wherein a display unit (10) is connected via a remote console (11) with the server switch-over device (1).

* * * * *